United States Patent [19]

Barrera

[11] Patent Number: 4,580,606

[45] Date of Patent: Apr. 8, 1986

[54] APPARATUS FOR FORMING STATOR COILS OF UNDULATORY TYPE FOR DYNAMO-ELECTRIC MACHINES

[75] Inventor: Giorgio Barrera, Leumann, Italy

[73] Assignee: Officine Meccaniche Pavesi & C. S.p.A., Italy

[21] Appl. No.: 560,070

[22] Filed: Dec. 9, 1983

Related U.S. Application Data

[63] Continuation-in-part of Ser. No. 512,054, Jul. 8, 1983, Pat. No. 4,512,376.

[51] Int. Cl.$^4$ .............................................. B21F 3/00
[52] U.S. Cl. .................................................. 140/92.2
[58] Field of Search ............. 140/92.1, 71 R; 72/305, 72/308, 309, 422, 402; 29/596, 598

[56] References Cited

U.S. PATENT DOCUMENTS

| | | | |
|---|---|---|---|
| 3,559,699 | 2/1971 | Droell | 140/92.1 |
| 3,874,424 | 4/1975 | Muskulus | 140/92.1 |
| 4,121,627 | 10/1978 | Schmid | 140/92.1 |

FOREIGN PATENT DOCUMENTS

| | | | |
|---|---|---|---|
| 2351952 | 4/1974 | Fed. Rep. of Germany | 140/92.1 |
| 1439695 | 6/1976 | United Kingdom | 140/92.1 |

Primary Examiner—Lowell A. Larson
Attorney, Agent, or Firm—Sughrue, Mion, Zinn, Macpeak, and Seas

[57] ABSTRACT

Apparatus for forming stator coils constituted by multi-lobed turns, for dynamo-electric machines, comprises a first circumferential series of forming elements located at equal distances from a central axis and equiangularly spaced from each other, and a second circumferential series of forming elements equiangularly located about the said central axis and intercalated between the forming elements of the first series. The forming elements of the second series are moveable radially relative to the said central axis between an outer position which is spaced from the central axis by a distance greater than the distance between the central axis and the forming elements of the first series, and an inner position which is spaced from the central axis by a distance less than the distance between the central axis and the elements of the first series. A copper wire is wound about the first circumferential series of forming elements to form a polygonal coil and the forming elements of the second series are moved radially inwardly against the sides of the polygonal coil so as to curve these sides towards the center of the coil. The forming elements of the first series are free to move radially towards the central axis as a result of the thrust exerted against the sides of the polygonal coil by the elements of the second series. Automatic operating devices are provided for clamping one end of the copper wire to one of the forming elements of the first series before the start of the winding operation and for cutting the copper wire at the end of the winding operation.

1 Claim, 8 Drawing Figures

APPARATUS FOR FORMING STATOR COILS OF UNDULATORY TYPE FOR DYNAMO-ELECTRIC MACHINES

CROSS REFERENCE TO RELATED APPLICATIONS

The present application is a continuation-in-part of U.S. patent application Ser. No. 512,054, filed July 8, 1983, now U.S. Pat. No. 4,512,376, granted Apr. 23, 1985.

The present invention relates to apparatus for forming stator coils of undulatory type constituted by turns of multi-lobed form, for dynamo-electric machines.

The object of the present invention is to provide apparatus of the said type which is simple, reliable and practical.

The main characteristic of the apparatus according to the invention lies in the fact that it comprises:

a first circumferential series of forming elements located at equal distances from a central axis and equiangularly spaced from each other, a second circumferential series of forming elements equiangularly located about the said central axis and intercalated between the forming elements of the first series, the forming elements of the second series being movable radially relative to the said central axis between an outer position which is spaced from the central axis by a distance greater than the distance between the central axis and the forming elements of the first series, and an inner position which is spaced from the central axis by a distance less than the distance between the central axis and the forming elements of the first series, means for winding a copper wire about the first circumferential series of forming elements so as to form a polygonal coil, means for moving the forming elements of the second series radially from their outer positions towards their inner positions, thrusting them against the sides of the polygonal coil so as to curve these sides towards the centre of the coil, imparting to the latter its desired multi-lobed configuration, in which the forming elements of the first series are also free to move radially towards the central axis from the position in which they are located during the forming of the polygonal coil, under the action of the thrust exerted against the sides of the polygonal coil by the forming elements of the second series, and means for opposing the said radial movement of the forming elements of the first series towards the central axis.

Preferably the said opposing means are constituted by fluid damper means.

According to a further preferred characteristic, the forming elements of the first series and of the second series are each connected to one end of an L-shaped curved flexible cable having a first section extending radially from the respective forming element towards the central axis and a second section extending parallel to and adjacent the central axis, the free end of this second section being connected to a respective slide movable parallel to the central axis to effect the radial displacement of each forming element which is connected thereto, two such slides being provided, the forming elements of the first series and of the second series respectively being connected thereto. The apparatus further includes two double acting fluid cylinders for effecting the movement of the slides; that chamber of the fluid cylinder associated with the forming elements of the first series which diminishes in volume during the radially inward displacement of these elements is connected through a restricted flow passage with a discharge reservoir when the other fluid cylinder effects a radially inward displacement of the forming elements of the second series. This achieves the damping action opposing the radially inward movement of the forming elements of the first series.

According to a further preferred characteristic, the said two slides are mounted for sliding movement parallel to the said central axis on guides carried by a support frame which supports for rotation about the said central axis a bell member having radial guides on which the forming elements of the first series and of the second series are slidably mounted. Means are provided for rotating the bell member to form the polygonal coil; moreover, the two series of flexible cables connected respectively to the forming elements of the first series and of the second series are in their turn connected to two bushes rotatably mounted about the central axis on the two said slides.

A further characteristic of the apparatus according to the invention lies in the fact that the said support frame is movable parallel to the central axis to allow the forming elements, once the undulatory coil has been formed thereon, to be brought adjacent an inserter tool of known type for inserting the coil in the cavity of a stator. Extractor means are moreover provided for thrusting the undulatory coil carried by the forming elements axially so as to remove it from the forming elements and to deposit it on the said inserter tool.

Preferably the extractor means mentioned above comprise a star of radial blades carried at one end of a central axially slidable rod connected to the bell member for rotation therewith.

A further characteristic of the apparatus according to the invention lies in the fact that the apparatus further includes automatically operating means for clamping one end of the copper wire to one of the forming elements of the first series before the start of the winding operation and for cutting the copper wire at the end of the winding operation, these means including:

a pair of clamp plates carried by the forming element of the first series, resilient means biasing the two clamp plates into mutual contact, an actuator member for moving the two clamp plates apart against the action of the said resilient means, a movable support structure carrying the said actuator member arranged to be brought adjacent the said forming element of the first series provided with the clamp plates, a wire feed unit, movable with respect to the said support structure for feeding a predetermined length of wire between the two clamp plates, a gripper for gripping the wire and an actuator cylinder for controlling the gripper, both carried by the wire feed unit, a cutting unit for the wire carried by the said movable support structure.

Further characteristics and advantages of the present invention will emerge from the description which follows with reference to the appended drawings, provided purely by way of non-limiting example, in which.

Figure 6:
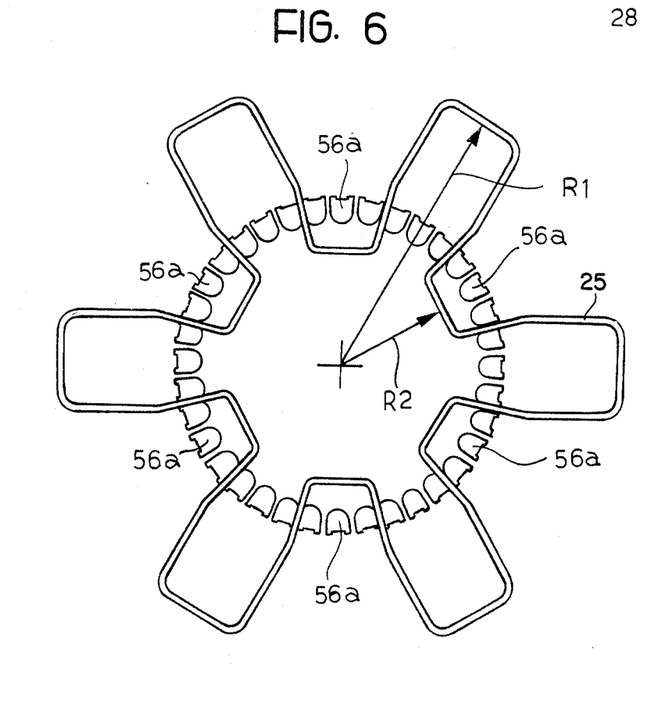
FIG. 6 is a schematic illustration of an undulatory coil obtained by means of the apparatus of FIGS. 1 to 5, disposed on a corresponding inserter tool.

In the drawings, reference numeral 1 generally indicates apparatus for forming stator coils of undulatory type, constituted by multi-lobed turns, for dynamo electric machines. In FIG. 6 the reference C indicates the profile of an undulatory coil obtainable by means of the apparatus 1.

This apparatus comprises a fixed structure 2 having two cylindrical vertical guide posts 3 (only one of which is visible in FIG. 2) on which a support frame 5 is slidable with the interposition of bushes 4. The vertical movements of the support frame 5 relative to the fixed structure 2 are effected by a hydraulic cylinder 6 the body of which is fixed to the structure 2 and the shaft of which is connected to an attachment 7 rigid with the support frame 5.

The support frame 5 supports a bell member 10 for rotation about an axis 8 by means of rolling bearings 9. The bell member 10 has a first circumferential series of forming elements 11 (only one of which is visible in FIGS. 1, 2) disposed at equal distances from the central axis 8 and equiangularly spaced from each other (see also FIGS. 3, 4). The bell member 10 is also provided with a second circumferential series of forming elements 12 equiangularly spaced about the said central axis 8 and intercalated between the forming elements 11 of the first series so that each element 12 is interposed between two elements 11.

Each of the forming elements 11 is carried by a support 13 which is slidably mounted on a guide rod 14 carried by the bell member 10 and projecting radially relative to the central axis 8. Each of the forming elements 12 is articulated about an axis 15 to a support 16 which is also slidably mounted on a radial guide rod 17 carried by the bell member 10. This member is fixed to an end flange 18 of a sleeve 19 which is rotatably mounted on the support frame 5 by means of the rolling bearings 9. A pulley 20 is keyed to the sleeve 19 and connected by means of an endless belt 21 to a pulley 22 rotatable by a motor 24 (see FIG. 1) through a shaft 23.

The motor 24 rotates the bell member 10 about the axis 8 by means of the shaft 23, the transmission belt 21 connecting the pulleys 20, 22 and the sleeve 19. The rotation imparted to the bell member 10 allows a copper wire to be wound about the first circumferential series of forming elements 11 so as to form a polygonal shaped coil, part of the profile of which is indicated by 25 in FIG. 3. For this purpose, one of the forming elements 11 has a device 26 for anchoring one end of the copper wire.

Figure 5:
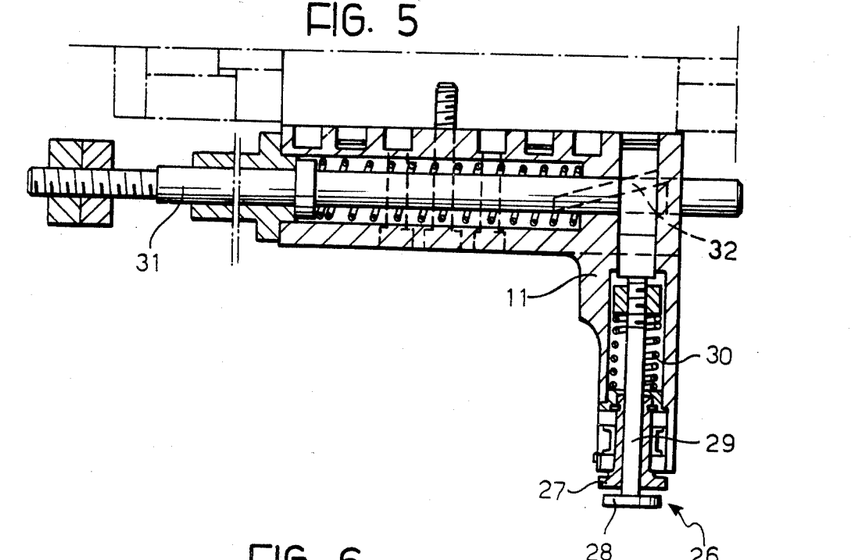
FIG. 5 is a sectional view of a detail of the apparatus.

With reference to FIG. 5, the device 26 includes two horizontal discs 27, 28 of which the first is fixed to the body of the forming element 11 and the second is fixed to one end of a vertical shaft 29 which is urged upwardly by a spring 30. The shaft 29 may be moved downwardly against the action of the spring 30, by movement of a shaft 31 towards the right (as viewed in FIG. 5), the shaft 31 having one end outside the forming element 11 on which an actuator cylinder 75 (see FIG. 7), acts and its other end inside the forming element (the right-hand end in FIG. 5) and being arranged to lower the shaft 29 by the engagement therewith of a cam surface 32.

Figure 7:
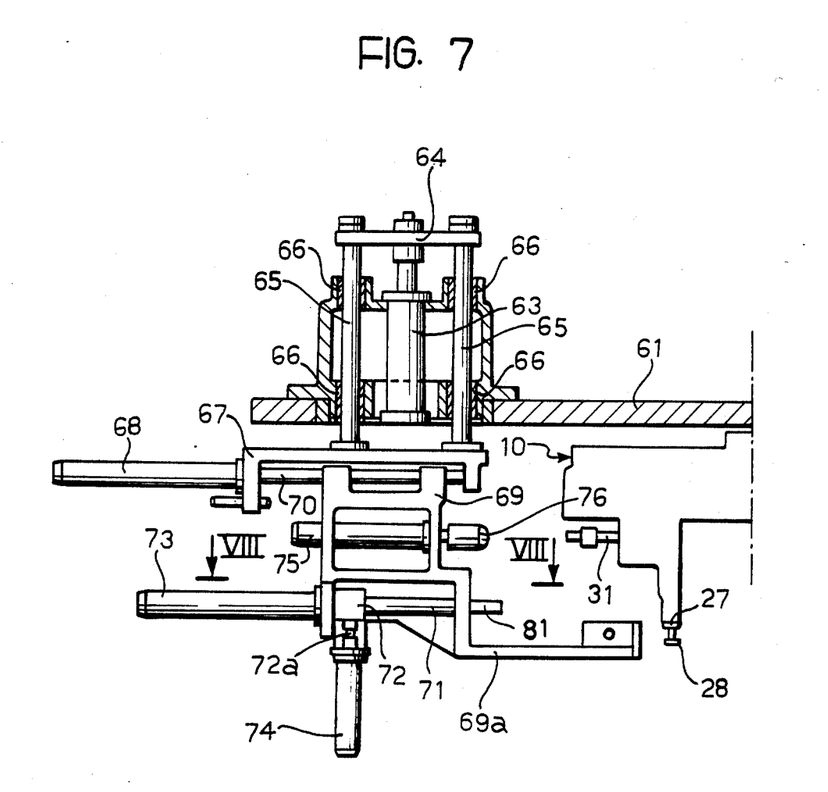
FIG. 7 is a partial elevated view of the unit for feeding and cutting the wire.
Figure 8:
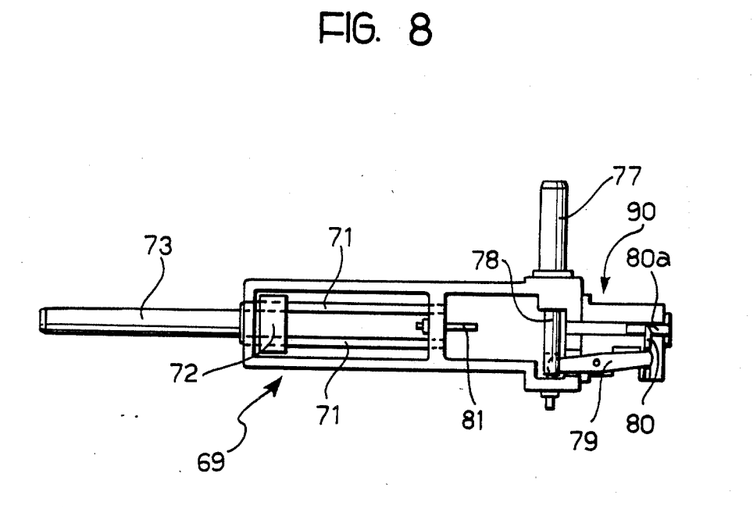
FIG. 8 is a sectional view taken along the line VIII—VIII of FIG. 7.

FIGS. 7 and 8 are a partial elevational view and a sectional view taken on line VIII—VIII of FIG. 7 respectively and illustrate the unit for feeding and cutting the wire.

Reference numeral 61 indicates a support plate carried by the support frame 5 so as to be orientable about the axis 8. The plate 5 slidably supports, with the interposition of bushes 66, two rods 65 connected at their upper ends by a bracket 64. The bracket 64 is movable vertically by means of an actuator cylinder 63 fixed to the plate 61. The lower ends of the rods 65 carry a frame 67 including two horizontal guide rods 70 (only one of which is visible in FIG. 7). On the rods 70 there is slidably mounted a structure 69 for supporting the wire supply unit. Horizontal movement of the support structure 69 is effected by means of an actuator cylinder 68 fixed to the frame 67. The support structure 69 carries the actuator cylinder 75 the piston rod of which is provided with a thrust member 76 for operating discs 27, 28 for clamping the wire. The frame 69 further includes two horizontal guide rods 71 (see also FIG. 8) on which is slidably mounted the wire feed unit (indicated by reference numeral 72). This unit carries a gripper 72a for gripping the wire and an actuator cylinder 74 for operating the gripper. Horizontal movement of the unit 72 is effected by an actuator cylinder 73 fixed to the support structure 63. This latter includes a frame 69a which carries a wire cutting unit 90 (not illustrated in FIG. 7). This unit includes an actuator cylinder 77 fixed to the frame 69a and including a rod 78, a return lever 79 and a blade 80 able to project into a guide passage for the wire 80a. The reference numeral 81 indicates a screw pin carried by the structure 69 and having one part projecting towards the unit 72. The length of this projecting part is adjustable in order to allow the adjustment of the travel of the unit 72.

Figure 2:
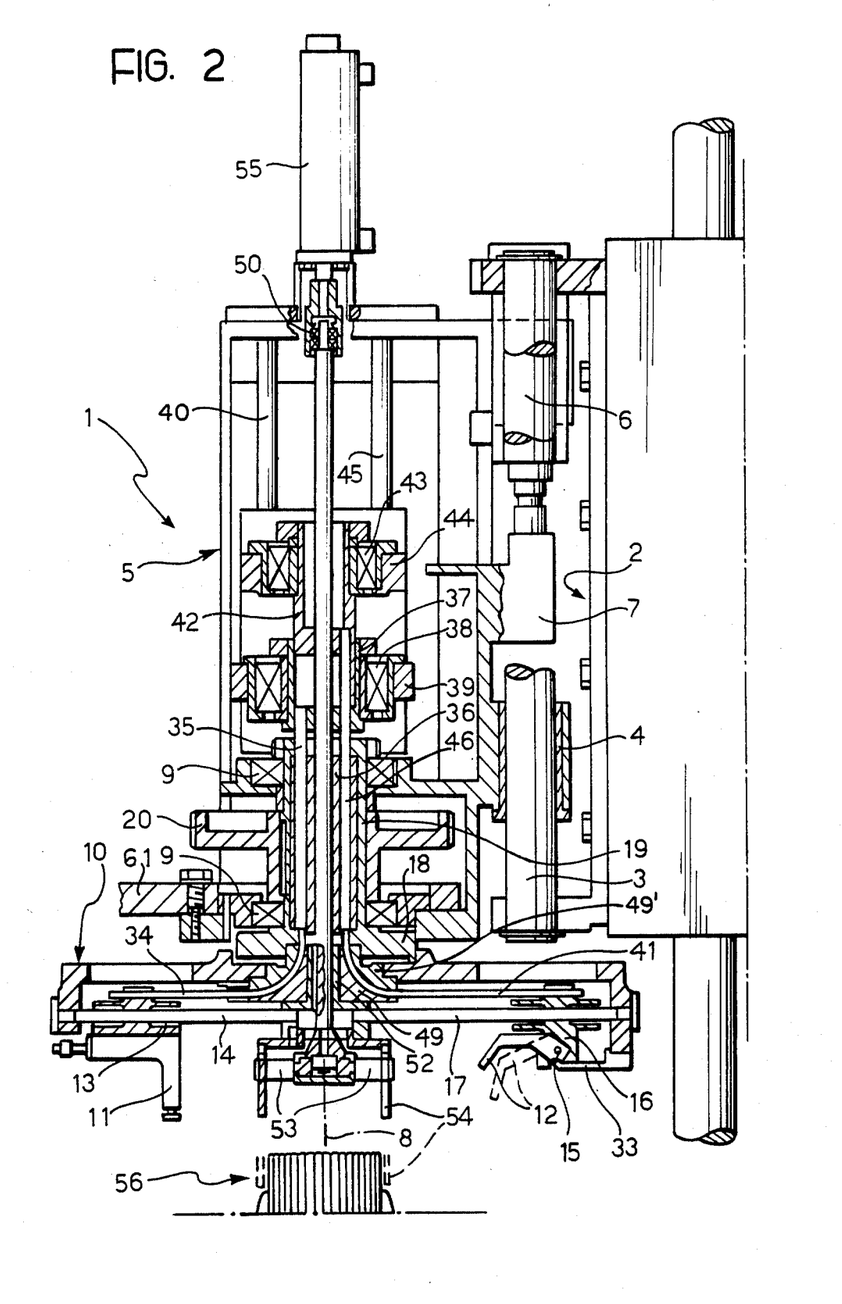
FIG. 2 is a sectional view taken on line II—II of FIG. 1, FIGS. 3, 4 are two views of the apparatus of FIGS. 1, 2 from below, illustrating two different conditions of operation of the apparatus.
Figure 3:
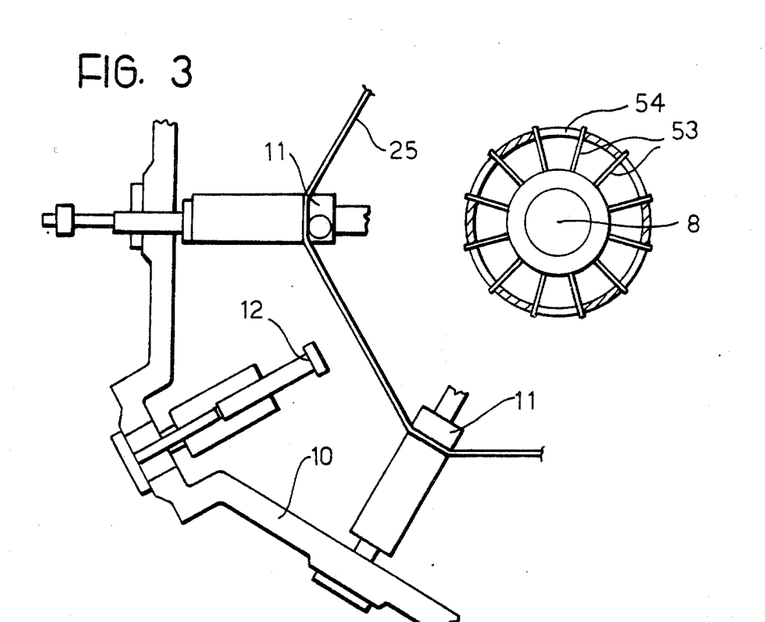
Figure 4:
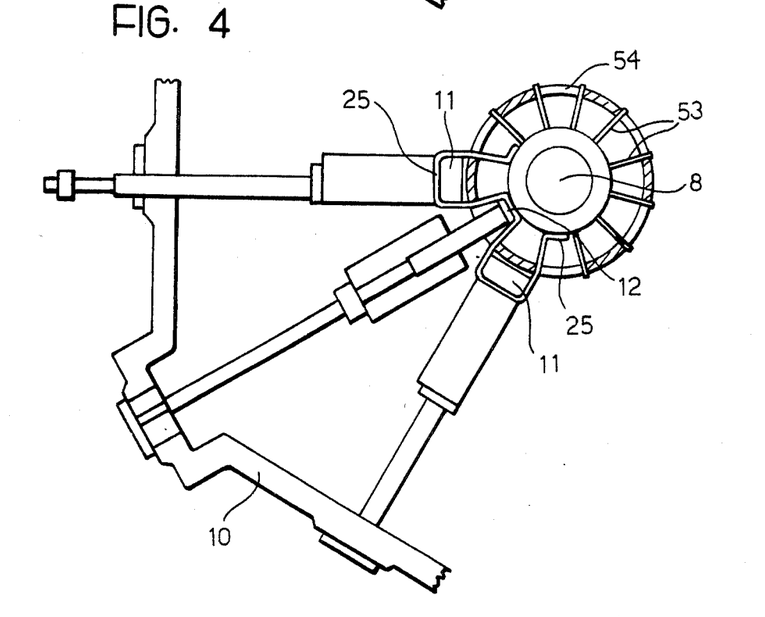

With reference to FIG. 2, each forming element 12 of the second series is movable between an outer position (illustrated in FIGS. 2, 3) and an inner position (illustrated in FIG. 4). When the forming elements 12 are in their outer positions illustrated in FIG. 2, they are engaged by stop members 33 which hold them in the rotated condition illustrated in FIG. 2. In this condition, the forming elements 12 of the second series do not interfere with the copper wire during the winding thereof about the first series of forming elements 11.

Each of the supports 13 of the forming elements 11 of the first series is connected to a flexible metal cable 34 having an L-shaped curve therein. Each cable 34 has a section extending radially from the respective support 13 towards the central axis 8 and a second section extending parallel to and adjacent the central axis 8. This second section is housed in a sheath of thermo-hardening plastics material 35 which passes through an axial hole in a cylindrical body 36 mounted within the bush 19. The upper ends of the flexible cables 34 which are connected to the forming elements 11 of the first series are connected to a bush 37 which is rotatably mounted about the axis 8 by means of a rolling bearing 38 carried by a slide 39 (see also FIG. 1). The slide 39 is mounted for vertical sliding movement on guide rods 40 carried by the support frame 5.

Similarly, the supports 16 of the forming elements 12 of the second series are connected by means of a further series of flexible cables 41 to a bush 42 which is rotatably mounted about the axis 8 by means of a rolling bearing 43 on a slide 44 mounted for vertical sliding movement on guide rods 45 (also visible in FIG. 2) carried by the support frame 5. Each flexible cable 41, in a manner similar to the cables 34, has a first section extending radially from the respective support 16 towards the central axis 8 and a second section extending parallel to and adjacent the axis 8 and housed within a sheath 46 which passes through a corresponding hole in the cylindrical body 36.

Figure 1:
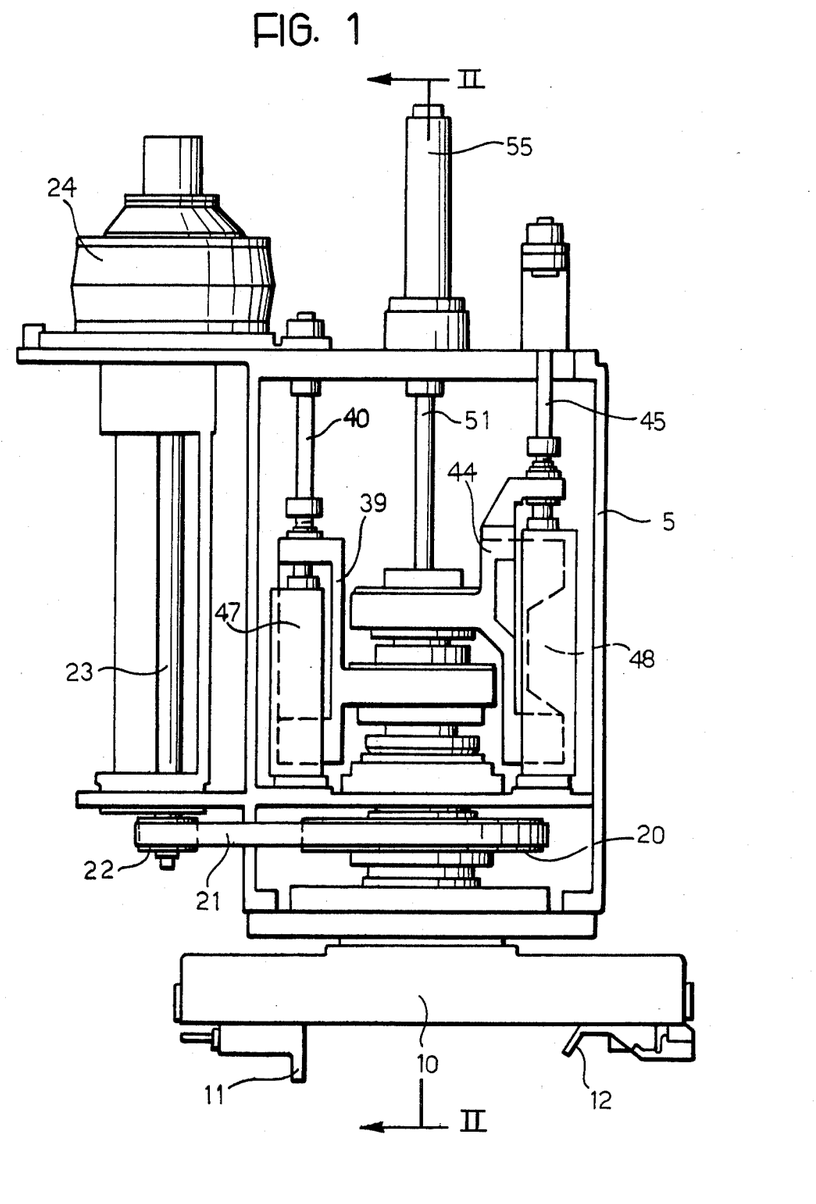
FIG. 1 is a side elevational view of an apparatus according to the present invention.

The vertical movements of the two slides 39, 44 relative to the support frame 5 are effected by two actuator cylinders 47, 48 carried by the frame 5 (see FIG. 1).

The central elbow portions of the flexible cables 34, 41 are guided in passages of corresponding shape defined by two half bushes 49, 49′ constituting the hub of the bell member 10.

The apparatus 1 finally includes a central rod 51 freely rotatably mounted by means of rolling bearings 50 on the support frame 5 and connected for rotation with a bush 52 fixed within the hub of the bell member 10. The bush 52 has a cup-shaped end which supports the inner ends of the radical guide rods 14, 17. Furthermore, to the lower end of the central rod 51 there is fixed a star of radial blades 53. The outer ends of the blades 53 are guided for vertical sliding movement by a slotted skirt 54 fixed to the cup-shaped end of the bush 52.

The central rod 51 is movable axially relative to the support frame 5 and this movement is effected by means of a hydraulic cylinder 55.

In FIG. 2 an inserter tool 56 of known type (see for example U.S. Pat. No. 3,324,536) is shown in broken outline and is intended to receive the undulatory coil after it has been formed by the apparatus 1 and to insert it subsequently in the cavity of a stator.

The operation of the apparatus described above is as follows.

At the beginning of the cycle the bell member 10 is stopped with the forming elements 11 in the outer position (See FIG. 2). The frame 67 which supports the wire feed unit 72 and the wire cutting unit 90 is in its lowered position (illustrated in FIG. 7) and the actuator cylinder 75 is in its retracted condition as illustrated in FIG. 7. The unit 72 is also in the withdrawn position in FIG. 7 and the gripper 72a is open.

At this point the actuator cylinder 75 is operated to move the wire clamping discs 27, 28 apart. The end of the wire is then brought close to the gripper 72a and the cylinder 74 is operated to allow the gripper to grasp the wire at a certain distance from its end. The cylinder 73 is then operated to advance the wire feed unit 72. The end of the wire thus comes into correspondence with the discs 27, 28 by which it is grasped after retraction of the cylinder 75. The cylinder 74 is then retracted to open the gripper 72a, the structure 69 is retracted by means of the cylinder 68 and the frame 67 is raised to allow the start of the winding (all the said operations are effected automatically). To this end the forming elements 11, 12 are located in the radially outer positions illustrated in FIG. 2. One end of the wire from which the coil is to be formed is anchored by means of the device 26 to one of the forming elements 11. The bell member 10 is then rotated by means of the motor 24. As a result of this rotation the copper wire is wound about the circumferential series of forming elements 11, forming the polygonal coil 25. During this phase, the stop members 33 keep the forming elements 12 in the rotated position illustrated in FIG. 2 so as not to interfere with the copper wire during its winding on the forming elements 11. As is illustrated in FIG. 4, when the forming elements 12 are in their radially outer positions they are spaced from the central axis 8 by a distance greater than the distance between this axis and the forming elements 11.

Once the forming of the polygonal coil 25 has been completed the motor 24 is stopped and the slide 44 is raised relative to the support frame 5 by means of the cylinder 48. Upon this raising, the bush 42 connected to the slide 44 moves the supports 16 of the forming elements 12 of the second series radially inwardly by means of the flexible metal cables 41. Immediately the supports 16 have moved towards the central axis 8, the forming elements 12 disengage from the stop members 33 and move into the operative condition illustrated in broken outline in FIG. 2. The raising of the slide 44 being continued, the forming elements 12 of the second series then come into contact with the sides of the polygonal coil 25 and curve them inwardly so as to give the polygonal coil the desired multi-lobed configuration (see FIG. 4).

During this stage, the chamber of the cylinder 47 which reduces in volume as a result of a radially inward movement of the forming elements 11 is connected to a discharge reservoir (not illustrated) through a restricted flow passage (not illustrated).

By virtue of this arrangement, the forming elements 11 of the first series are free to move radially inwardly as a result of the thrust exerted by the forming elements 12 of the second series against the sides of the polygonal coil 25; however, the radially inward movement of the forming elements 11 is opposed by the cylinder 47 which, during this stage, acts as a damper.

FIG. 4 illustrates the positions of the forming elements 11, 12 at the end of the forming stage. In this condition, the forming elements 12 of the second series are located in the inner positions closer to the central axis 8 than the corresponding inner positions of the forming elements 11.

The fact that the forming elements 11 of the first series are also free to move radially inwardly during the inward movement of the forming elements 12 of the second series allows the apparatus 1 to be used to form undulatory coils of different proportions, that is, with different values of the ratio between their outer radius $R_1$ and their inner radius $R_2$ (see FIG. 6). Indeed, if the forming elements 11 of the first series were in a radially fixed position, the apparatus 1 would be usable to form undulatory coils having a ratio $R_2/R_1$ not less than a determined value. Below this value there would be a risk of the metal wire breaking as a result of the thrust exerted thereon by the forming elements 12.

In the apparatus according to the invention, the forming elements 11 of the first series are, however, free to move radially inwardly under the action of the thrust exerted on the sides of the polygonal coil 25 by the forming elements 12 of the second series so as to allow undulatory coils to be formed with any value of the ratio $R_2/R_1$ while at the same time avoiding risk of the copper wire breaking. At the same time, the use of the damper means arranged to oppose the radially inward movement of the forming elements 11 of the first series allows these forming elements 11 to present the resistance necessary to form the coil with the multi-lobed configuration.

Once the undulatory coil has been formed, the cylinder 6 lowers the support frame 5 relative to the fixed structure 2 so as to bring the lower end of the rod 51 close to the inserter tool 56 (in FIG. 2 the position of the slotted skirt 54 corresponding to the lowered condition of the support frame 5 is illustrated in broken outline). The frame 67 is then lowered (FIG. 7) and the support structure 69 is advanced by means of the cylinder 68; the blade 80 is then actuated to cut the wire and the cylinder 76 is actuated to free the end of the wire which was gripped by the discs 27, 28. The cylinder 55 then lowers the rod 51. As a result of this lowering the radial blades 53 push the coil 2 axially downwardly, inserting it between the blades 56a of the inserter tool as illustrated schematically in FIG. 6. In order to facilitate this operation, the elements 11 are previously moved slightly towards the axis 8 so as to reduce the tension of the copper wire thereon.

Once the undulatory coil has been deposited on the inserter tool 56, the cylinder 55 raises the rod 51 and the cylinder 6 returns the support frame 5 to its raised position. The cylinders 47, 48 are then actuated to return the forming elements 11, 12 to their radially outer positions. The apparatus is thus arranged again to form another coil.

Preferably several apparatuses of the type described above are mounted on the same machine. In this case, the fixed structure 2 is constituted by a central column which supports the various apparatuses for forming the coils at equiangularly spaced positions. Below the apparatuses, the machine has a rotatable platform on which several inserter tools are located. The number of inserter tools is equal to the number of apparatuses for forming the undulatory coils. After each inserter tool has received the undulatory coil from the corresponding forming apparatus disposed above it, the rotatable platform is rotated so as to bring each inserter tool beneath the adjacent forming apparatus which deposits a new undulatory coil thereon which is angularly offset relative to the previous one.

Naturally, while adhering to the principle of the invention, constructional details and embodiments may be varied widely with respect to that described and illustrated without thereby departing from the scope of the invention.

What is claimed is:

1. Apparatus for forming stator coils having multi-lobed turns, for dynamo-electric machines, comprising:
   frame means having a central axis,
   a first circumferential series of forming elements supported in said frame means at equal distances from said central axis and equiangularly spaced from each other,
   a second circumferential series of forming elements supported on said frame means equiangularly about the said central axis and intercalated between the forming elements of the first series, the forming elements of the second series being moveable radially relative to the said central axis between an outer position which is spaced from the central axis by a distance greater than the distance between the central axis and the forming elements of the first series, and an inner position which is spaced from the central axis by a distance less than the distance between the central axis and the forming elements of the first series,
   means on said frame means for winding a copper wire about the first circumferential series of forming elements so as to form a polygonal coil,
   means operatively connected to said elements of said second series for moving the forming elements of the second series radially from their outer positions towards their inner positions, thrusting them against the sides of the polygonal coil so as to curve these sides towards the centre of the coil giving the latter its desired multi-lobed configuration,
   said forming elements of said first series being supported for movement radially towards the central axis from the position in which they are located during the forming of the polygonal coil, as a result of the thrust exerted against the sides of the polygonal coil by the forming elements of the second series,
   means for opposing the said radial movement of the forming elements of the first series towards the central axis; and
   automatic operating means for securing one end of the copper wire to one of the forming elements of the first series before the start of the winding operation and means for cutting the copper wire at the end of the winding operation, said means including:
   a pair of clamping discs carried by a forming element of the first series,
   resilient means biasing the two clamping discs toward each other for engaging the copper wire
   an actuator member for moving the two clamping discs apart against the action of the resilient means,
   a moveable support structure mounted on said frame means, carrying the said actuator member, arranged to be brought adjacent the said forming element of the first series provided with the clamping discs,
   a wire feed unit moveable with respect to said support structure for engaging and feeding a predetermined length of wire between the two clamping discs,
   a gripper for gripping the wire and an actuator cylinder for controlling the gripper, both carried by the wire feed unit, and
   a cutting unit for the wire carried by the said moveable support structure.

* * * * *